(12) United States Patent
Di Sessa

(10) Patent No.: US 12,504,300 B2
(45) Date of Patent: Dec. 23, 2025

(54) DEVICES WITH HALL EFFECT USER INTERFACE CONTROL

(71) Applicant: Azena Medical, LLC, Walnut Creek, CA (US)

(72) Inventor: Alexandre B. Di Sessa, Walnut Creek, CA (US)

(73) Assignee: Azena Medical, LLC, Walnut Creek, CA (US)

( * ) Notice: Subject to any disclaimer, the term of this patent is extended or adjusted under 35 U.S.C. 154(b) by 295 days.

(21) Appl. No.: 18/345,825

(22) Filed: Jun. 30, 2023

(65) Prior Publication Data
US 2025/0003769 A1 Jan. 2, 2025

(51) Int. Cl.
G01D 5/14 (2006.01)
G01R 15/20 (2006.01)
G01R 33/07 (2006.01)

(52) U.S. Cl.
CPC ........... *G01D 5/145* (2013.01); *G01R 15/202* (2013.01); *G01R 33/072* (2013.01)

(58) Field of Classification Search
None
See application file for complete search history.

(56) References Cited

U.S. PATENT DOCUMENTS

| | | | | |
|---|---|---|---|---|
| 5,747,953 A * | 5/1998 | Philipp | ................ | H03K 17/97 388/907 |
| 6,013,991 A * | 1/2000 | Philipp | .............. | A61B 17/1626 388/907 |
| 6,175,233 B1 * | 1/2001 | McCurley | .............. | G01D 5/145 324/207.2 |
| 7,088,096 B2 * | 8/2006 | Etherington | ........... | G01D 5/145 324/207.2 |
| 9,475,149 B1 * | 10/2016 | Testrake | ........... | B29D 11/00317 |
| 10,249,166 B1 * | 4/2019 | Carter | ...................... | G08B 6/00 |
| 2002/0129663 A1 * | 9/2002 | Hoyt | ....................... | G01F 1/115 73/861.79 |
| 2004/0247445 A1 * | 12/2004 | Nelson | .............. | A61M 5/14224 417/1 |
| 2009/0143726 A1 * | 6/2009 | Bouton | ............. | A61M 5/14224 604/67 |
| 2009/0143727 A1 * | 6/2009 | Bouton | ................ | A61M 5/365 604/67 |
| 2010/0137802 A1 * | 6/2010 | Yodfat | ................ | F04B 43/1269 604/152 |
| 2016/0121061 A1 * | 5/2016 | Boucher | ............. | A61M 16/201 128/204.21 |
| 2016/0321422 A1 | 11/2016 | Albright | | |
| 2023/0003551 A1 * | 1/2023 | Jarzomski | .............. | G01D 5/145 |

(Continued)

FOREIGN PATENT DOCUMENTS

BR 102022020006 A2 4/2024

*Primary Examiner* — Fred Tzeng
(74) *Attorney, Agent, or Firm* — Carr & Ferrell LLP

(57) ABSTRACT

Devices with hall effect user interface control are disclosed herein. An example device includes a first portion having an energy storage module and a first magnet disposed on a terminal end of the first portion. A second portion having a display and a hall effect sensor, the first portion and the second portion being joined together in such a way that rotation of the first portion relative to the second portion causes the first magnet and the hall effect sensor to interact with one another in such a way that a user can control the display.

21 Claims, 8 Drawing Sheets

(56) References Cited

U.S. PATENT DOCUMENTS

| | | |
|---|---|---|
| 2023/0097981 A1 | 3/2023 | Sun et al. |
| 2023/0099922 A1 | 3/2023 | Sun et al. |
| 2025/0017624 A1* | 1/2025 | Cheng ................ A61B 17/7004 |
| 2025/0106031 A1* | 3/2025 | Parthe ....................... H04L 9/50 |
| 2025/0131382 A1* | 4/2025 | Williams ........... G06Q 10/1053 |
| 2025/0177641 A1* | 6/2025 | Beaupre ............ A61M 5/14216 |

* cited by examiner

DEVICES WITH HALL EFFECT USER INTERFACE CONTROL

CROSS-REFERENCE TO RELATED APPLICATIONS

N/A.

TECHNICAL FIELD

This disclosure pertains to medical devices, and more particularly, but not by way of limitation, to medical devices that comprise a two-part assembly that incorporates a hall effect sensor for device control; the medical device also provides haptic feedback. The hall effect sensors are included to allow the medical device to be used in a sanitary and safe manner.

SUMMARY

According to some embodiments, the present disclosure is directed to a device, comprising a first portion, the first portion comprising an energy storage module and a first magnet disposed on a terminal end of the first portion; a second portion, the second portion comprising a display; and a hall effect sensor, the first portion and the second portion being joined together in such a way that rotation of the first portion relative to the second portion causes the first magnet and the hall effect sensor to interact with one another in such a way that a user can control the display.

According to some embodiments, the present disclosure is directed to a method comprising joining a first portion of a medical device to a second portion of the medical device, the first portion comprising a first magnet, the second portion comprising a hall effect sensor; and rotating the first portion relative to the second portion to control a display of the medical device.

BRIEF DESCRIPTION OF DRAWINGS

Exemplary embodiments are illustrated by way of example and not limitation in the figures of the accompanying drawings, in which like references indicate similar elements.

DETAILED DESCRIPTION OF EXAMPLE EMBODIMENTS

Overview

The present disclosure pertains to devices that are two-part assemblies, referred to in combination as a handpiece. For example, the handpiece comprises a base portion and a tool portion. These handpieces can be used as medical devices to perform medical procedures such as ablation, cutting, cleaning, and the like. The devices enable user interaction with a user interface (UI) on a display using a hall-effect sensor or capacitive touch via the display. Some embodiments include an integrated display, and this display can be a touchscreen with capacitive touch capabilities. The user can confirm UI selections with a tap gesture. The user can also use other gestures such as swipes to interact with the UI on the display. In other embodiments, the hall-effect sensor on the handpiece can be used to control an external display that is connected in a wired or wireless manner. The handpieces also include haptic feedback elements to confirm user selections.

In some embodiments, the base portion houses a battery and magnets, while the tool portion has a hall effect sensor, a display, a controller, a gravity chip sensor, and a tip that can be used to deliver a laser to a patient. The base portion is associated with different procedures and procedure categories that are designated by battery size. When a first type of base portion is detached and replaced with a second type of base portion having a larger battery, a second type of procedure is enabled. A controller associated with the second portion can sense which type of base portion has been attached and can select the type of procedure allowed by that base portion. The association of procedure type is not limited to battery size but can be based on any difference between base portions. Certain features not associated with procedure type can also be loaded by different bases, such as power settings, laser brightness, and other customized settings.

Example Embodiments

Figure 1:
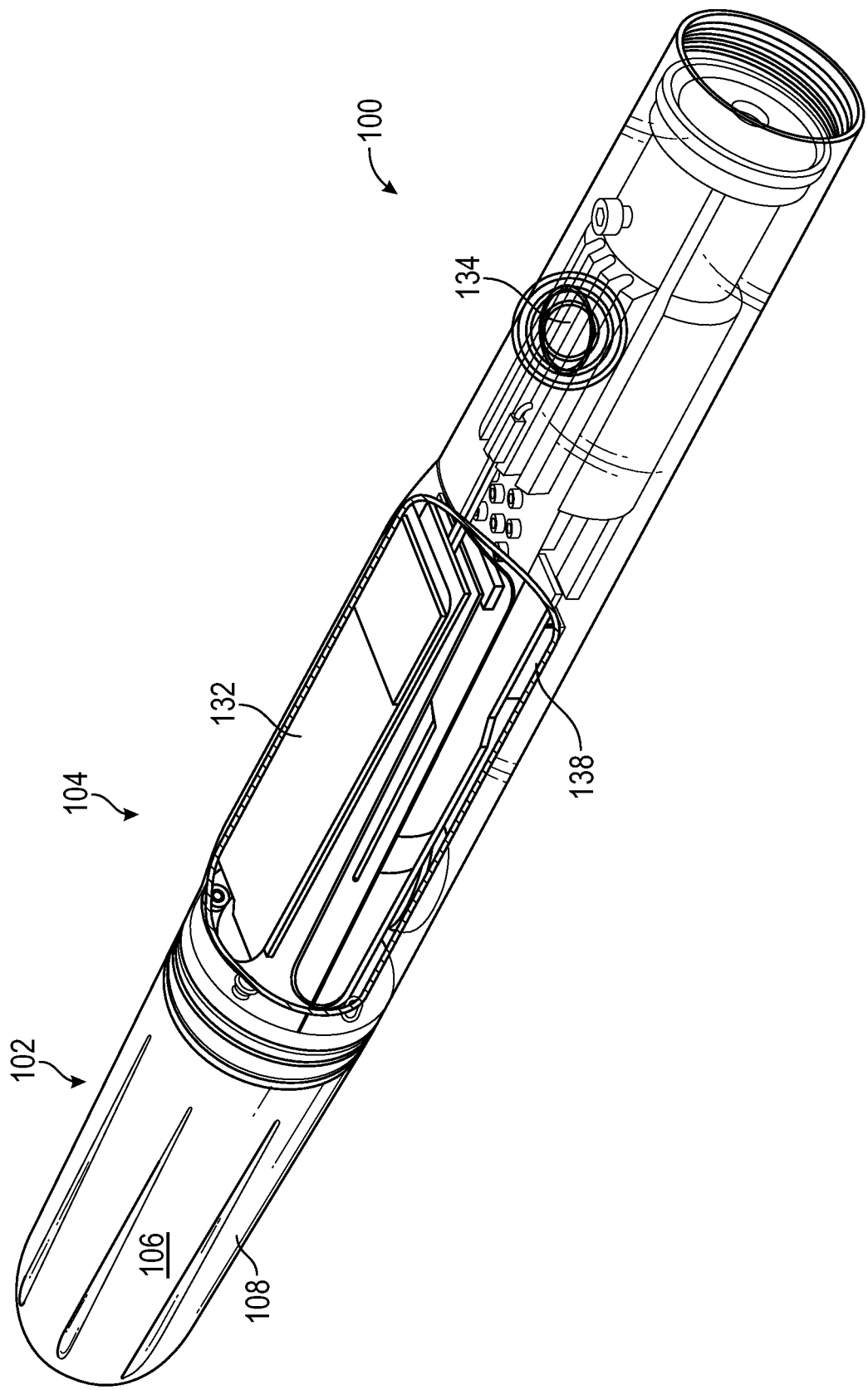
FIG. 1 is an example environment where aspects of the present disclosure can be implemented for use.

Referring now to FIG. 1, which illustrates an example architecture where aspects of the present disclosure are implemented. The example device 100 is a hand-held unit that is comprised of two pieces, a base portion 102 (may be referred to as a first portion) and a tool portion 104 (may be referred to as a second portion). In some embodiments, the base portion 102 includes an electrical energy storage module, such as a battery 106 enclosed in a housing 108.

Figure 2:
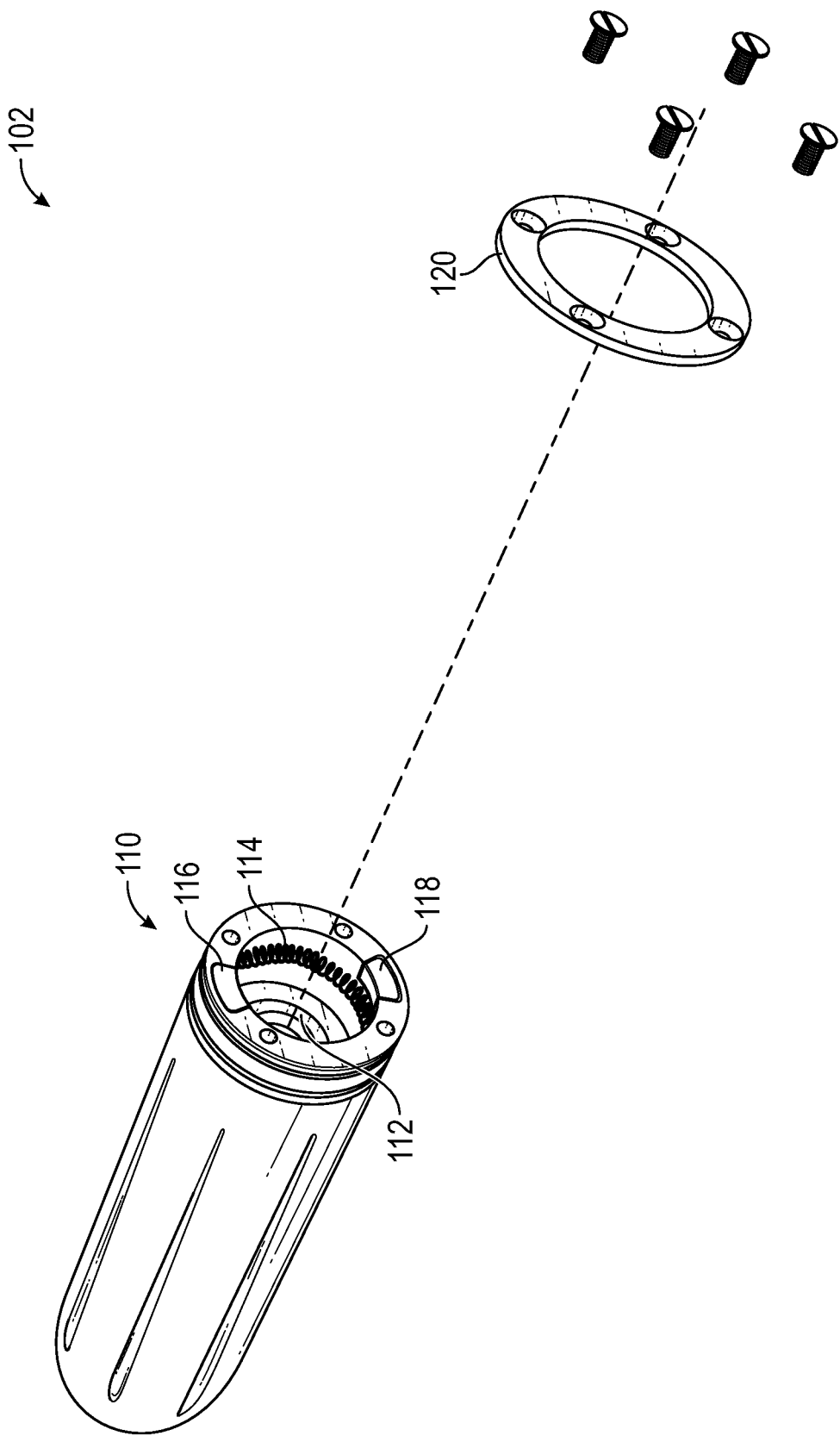
FIG. 2 is an exploded view of the base portion.
Figure 3:
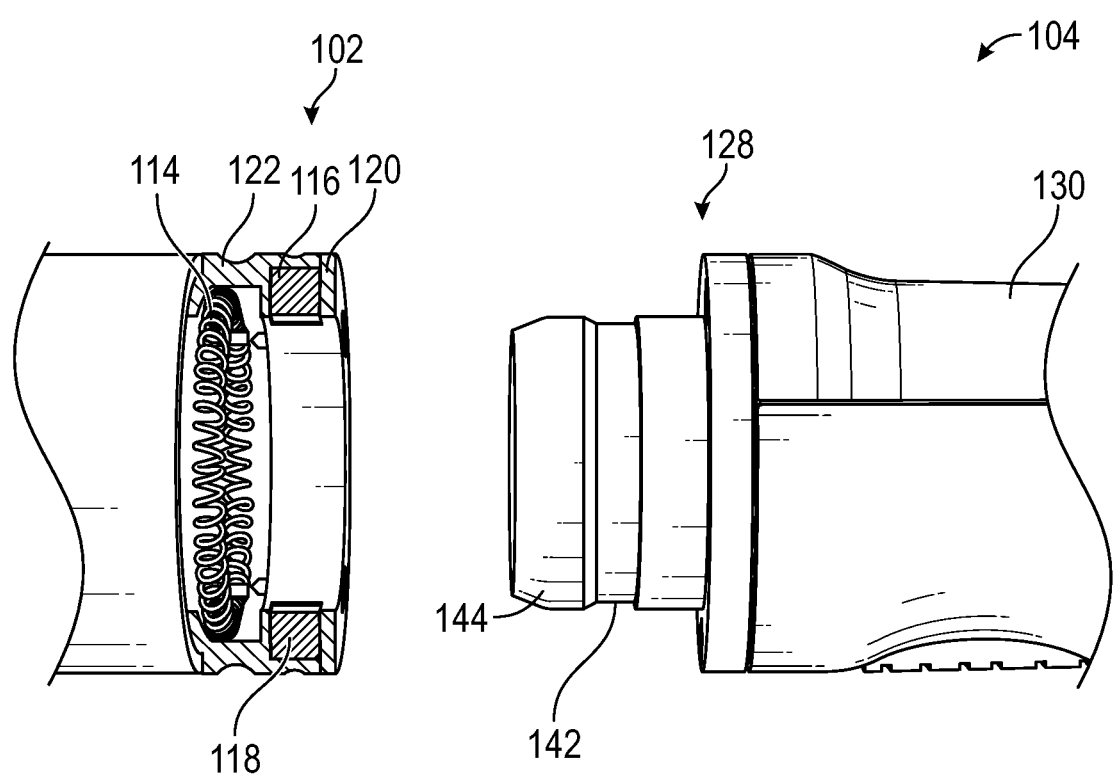
FIG. 3 is a view of the male adapter and a partial cutaway of the terminal end of the base portion.

Referring now to FIGS. 1-3 collectively, the base portion 102 includes a terminal end 110 having a first conductor 112, a spring loaded resilient element 114, a first magnet 116, a second magnet 118, and a spacer 120. The terminal end 110 has a collar 122 that extends out and forms a female receiver that mates with a male adapter of the tool portion 104, as will be discussed in greater detail herein.

The first magnet 116 and the second magnet 118 are located on the terminal end of the collar 122 and are spaced at a 180-degree interval relative to one another, although other spacings can be used. The spacer 120 is configured to cover and lock the first magnet 116 and the second magnet 118.

Figure 4:
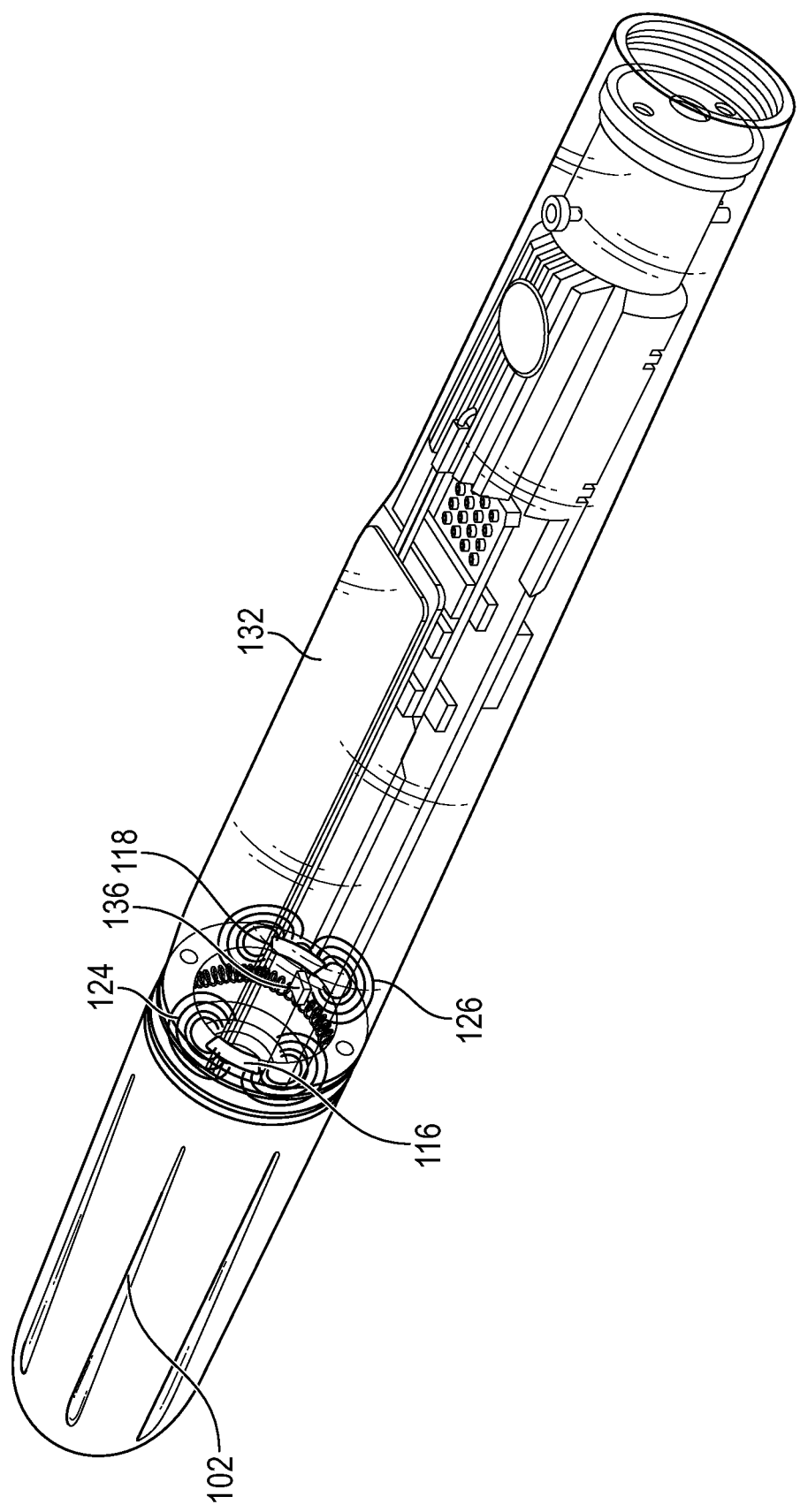
FIGS. 4 and 5 collectively illustrate magnetic fields interacting with a hall effect sensor.
Figure 5:
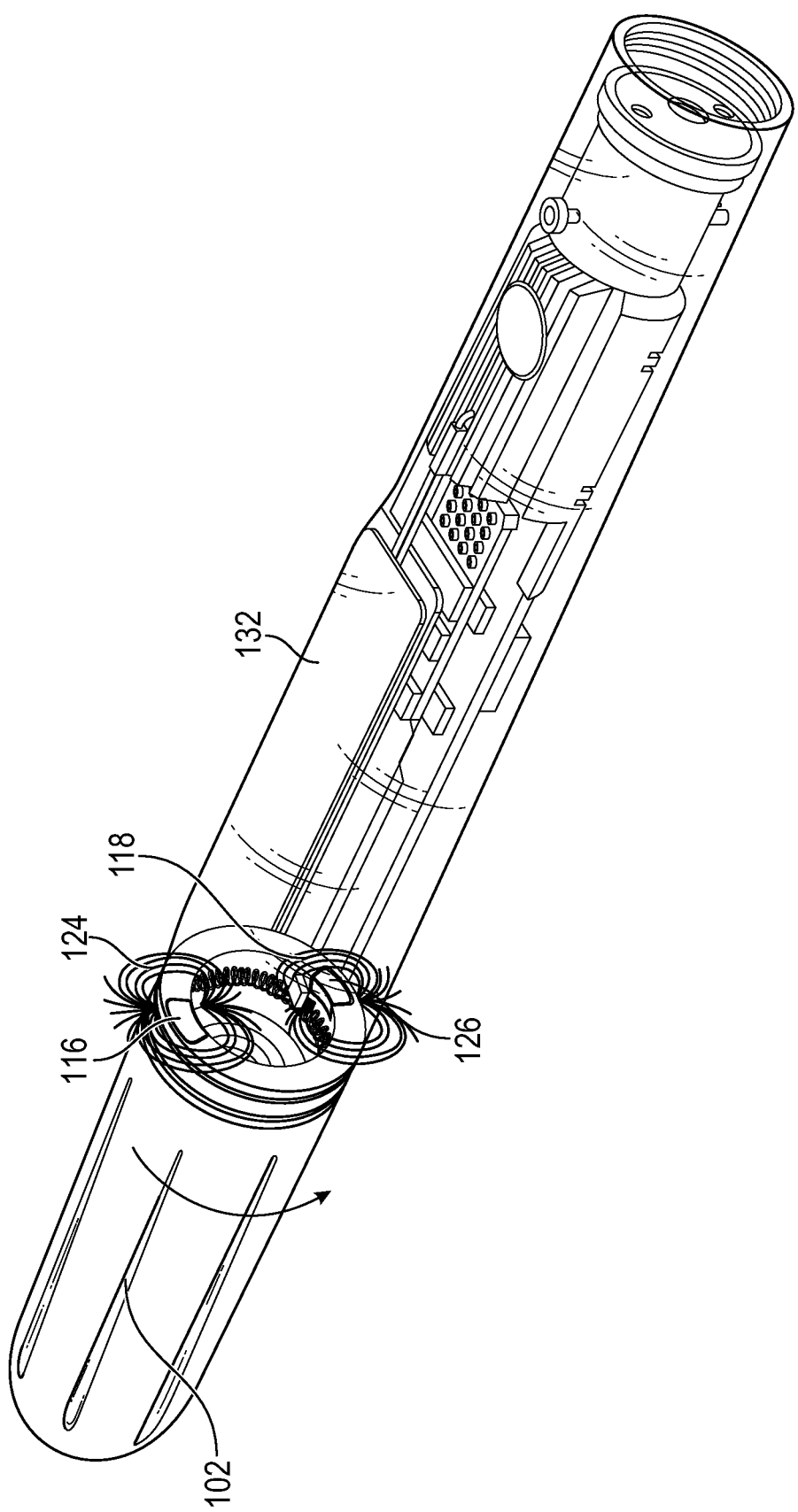

The first magnet 116 produces a first magnetic field (north pole) 124 and the second magnet 118 produces a second magnetic field (south pole) 126 (see FIGS. 4 and 5). These magnetic fields are distinguishable from one another by a hall effect sensor integrated into the tool portion 104.

The tool portion 104 has a male adapter 128, a housing 130, a display 132, a haptic element 134, a hall effect sensor 136, and a controller 138. The male adapter 128 is best illustrated in FIG. 3. The male adapter 128 acts as a second conductor that mates with the first conductor 112 when the base portion 102 is joined to the tool portion 104. When the base portion 102 is joined to the tool portion 104, components of the tool portion 104 can receive energy from the battery 106, such as the display 132, the controller 138, and the haptic element 134. It is noteworthy that the haptic element 134 can be located anywhere inside the tool portion 104.

In FIG. 3, the male adapter 128 is a tubular extension that includes a circumferential groove collar 142 and a tapered pre-loaded angle end 144. When the base portion 102 and the tool portion 104 are being joined, the tapered pre-loaded angle end 144 is inserted into the resilient element 114 and the user continues to push the base portion 102 and the tool portion 104 together until the resilient element 114 seats into the circumferential groove collar 142. This action provides a releasable locking force that keeps the base portion 102 and the tool portion 104 together until separated by the user. The base portion 102 and the tool portion 104 are shown in association FIG. 3. While in some embodiments, the resilient element 114 is a spring, the resilient element 114 could also be an O-ring, gasket, or the like.

Referring to FIGS. 1-5, the controller 138 comprises a processor and memory. The memory can store instructions that can be executed by the processor to perform various functions. In one example, the controller 138 can detect when a base portion is attached. Again, the base portion powers the components of the tool portion with energy from a battery in the base portion. As noted above, each base portion can be associated with a procedure type. For example, a first base portion can enable an ablation procedure, whereas a second base portion can enable a cutting procedure. In some instances, this is tied to the power level of the battery of the base portion, but this is not intended to be limiting. In some examples, the power level of two distinct base portions are equal, yet they are associated with two different procedures. The user may distinguish these two base portions by having housings with two different geometrical configurations that have a distinct look and feel to the user. Of note, the base portion can also act as a custom prescription of use to the device. As an example, the product can be used in consumer applications and such embodiments may have a custom base that will have pre-loaded procedures which will be referred to as a "prescription". Once attached, it will enable the user to utilize the procedures as prescribed by a doctor. In some instances, procedures, prescriptions, or instructions can be transmitted over a network and received by the device 100. For example, instructions can be transmitted from a doctor's office to the device in the patient's home.

Once the procedure type has been enabled, the controller 138 can control the display 132 and allow a user to make selections using input from the user rotation the base portion 102. Rotation of the base portion 102 causes the two magnets to interact with the hall effect sensor 136. Rotation of the base portion 102 in a first direction causes the display to scroll in a first direction, whereas rotation of the base portion 102 in a second direction causes the display 132 to scroll in a second direction. In one embodiment, the first direction is forward and the second direction is backward. In more detail, when the first magnet 116 is near the hall effect sensor 136, the first magnetic field 124 is sensed by the hall effect sensor 136; this is interpreted by the controller 138 as a forward scroll. When the second magnet 118 is near the hall effect sensor 136, the second magnetic field 126 is sensed by the hall effect sensor 136; this is interpreted by the controller 138 as a backwards scroll. This relates to the polarity of the magnets, where one magnet has a first polarity, and the second magnet has an opposing, second polarity Thus, in response to the signals received by the hall effect sensor 136 and magnets, the controller 138 can cause the display 132 to change. In sum, the base portion and the tool portion are joined together in such a way that rotation of the base portion relative to the hall effect sensor causes them to interact with one another in such a way that a user can control the display. To be sure, some embodiments can include only one magnet that can be used to interact with the UI and display 132. Other sensors can also be used, such as proximity sensors and gravity sensors. In this way, unidirectional scrolling is enabled. At a minimum, this allows the controller 138 to move a cursor of the display in response to the direction of rotation.

An example UI change caused by rotation of the base portion is shown FIGS. 4 and 5 collectively. In this example, rotation of the base portion 102 in a first direction causes the controller to present Procedure B and continued rotation of the base portion 102 in the first direction causes the controller to present Procedure C. The user can rotate the base portion 102 in a second direction to scroll back to Procedure B or the user can continue rotating the base portion 102 in the first direction until Procedure B is in view.

Figure 6:
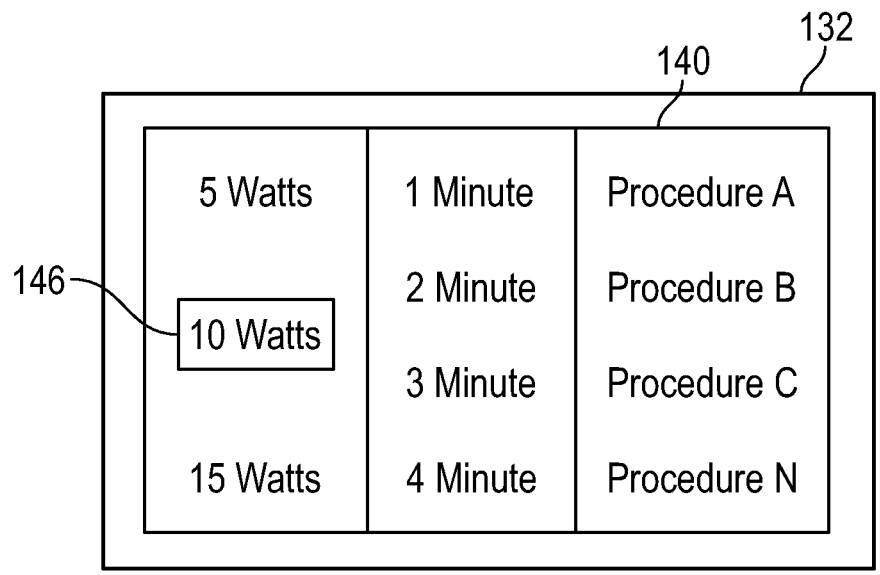
FIG. 6 is a schematic view of another example UI on a display.

Another example is illustrated in FIG. 6, which illustrates a UI 140 that is presented on the display 132. The UI 140 includes a cursor 146, and this cursor 146 can be moved by forward or backward rotation of the base portion 102. Again, this includes using the hall effect sensor to detect what magnet is in proximity to the hall effect sensor, to dictate the scrolling direction. To be sure, this configuration is not intended to be limiting but is an example. In other instances, the cursor can remain fixed, while UI elements are scrolled through and highlighted inside the cursor.

Referring to FIGS. 1-6, regardless of how the UI element is highlighted, when the user desires to select what is being presented on the display 132, the user can tap the display 132. This is due to the fact that in some instances, the display 132 is a touchscreen that enables gestures. It is an advantage that the user can scroll through a UI on the display 132 by rotating the base portion 102, because this limits user touches of the display 132, which may contaminate the display 132. A selection can be made by pushing the button located at the end of the base as well. In some embodiments, the handpiece can integrate a microphone that can receive voice commands that allow a user to select a procedure rather than touch the display. However, in some embodiments, the controller 138 can enable any number of gestures so that the user can utilize the display 132 to make selections or scroll through menus. Once the selection is made, the controller 138 may activate the haptic element 134 is activated to vibrate the handpiece to confirm the selection.

The controller 138 can then allow the user to perform a medical procedure in accordance with the procedure enabled by the base portion and the selection(s) made by the user through rotation of the base portion. The controller 138 can be used to control laser production by a laser source (not shown) integrated into the tool portion, and laser emission through the end of the device.

Figure 7:
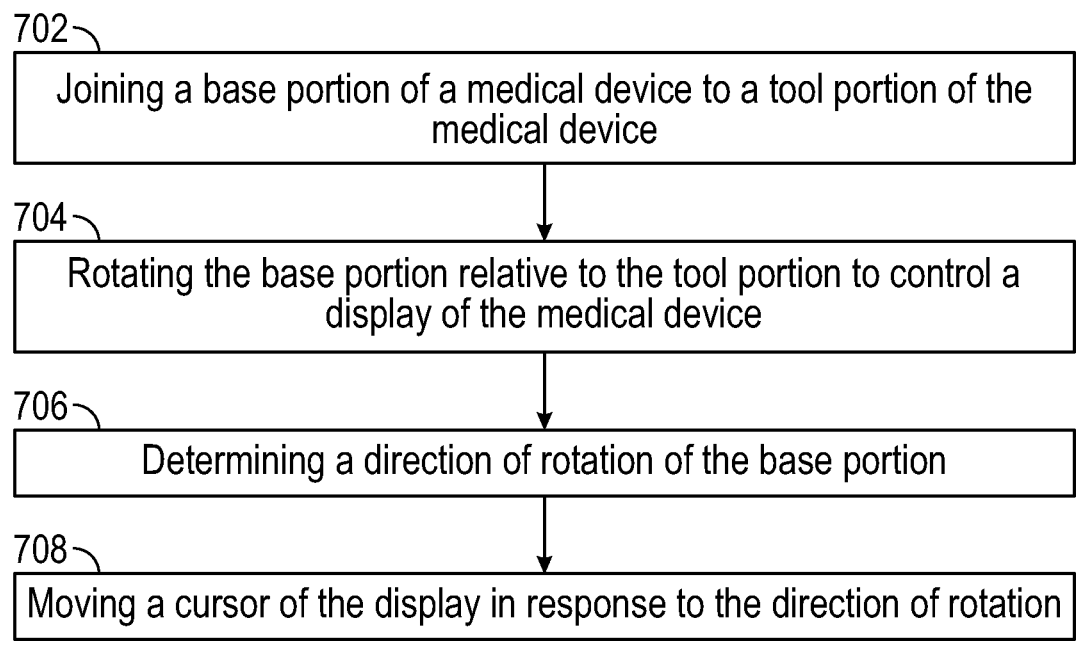
FIG. 7 is a flowchart of an example method.

FIG. 7 is a flowchart of an example method of the present disclosure. The method includes a step 702 of joining a base portion of a medical device to a tool portion of the medical device. To be sure, the base portion comprises one or more magnets and the tool portion comprises a hall effect sensor. Next, the method includes a step 704 of rotating the base portion relative to the tool portion to control a display of the medical device.

The method can include a step 706 of determining a direction of rotation of the base portion. This is accomplished when a hall effect sensor detects either the presence of a first magnet or a second magnet (and in some embodiments, the difference in polarity of the magnets). Each of these magnets produces a unique magnetic field that allows the hall effect sensor to differentiate which magnet is in proximity to the hall effect sensor. For example, when the first magnet is in proximity, the base portion has been rotated forward. When the second magnet is in proximity, the base portion has been rotated backward.

Next, the method includes a step 708 of moving a cursor of the display in response to the direction of rotation. This can alternatively include scrolling through programs or other types of options presented on the UI.

Figure 8:
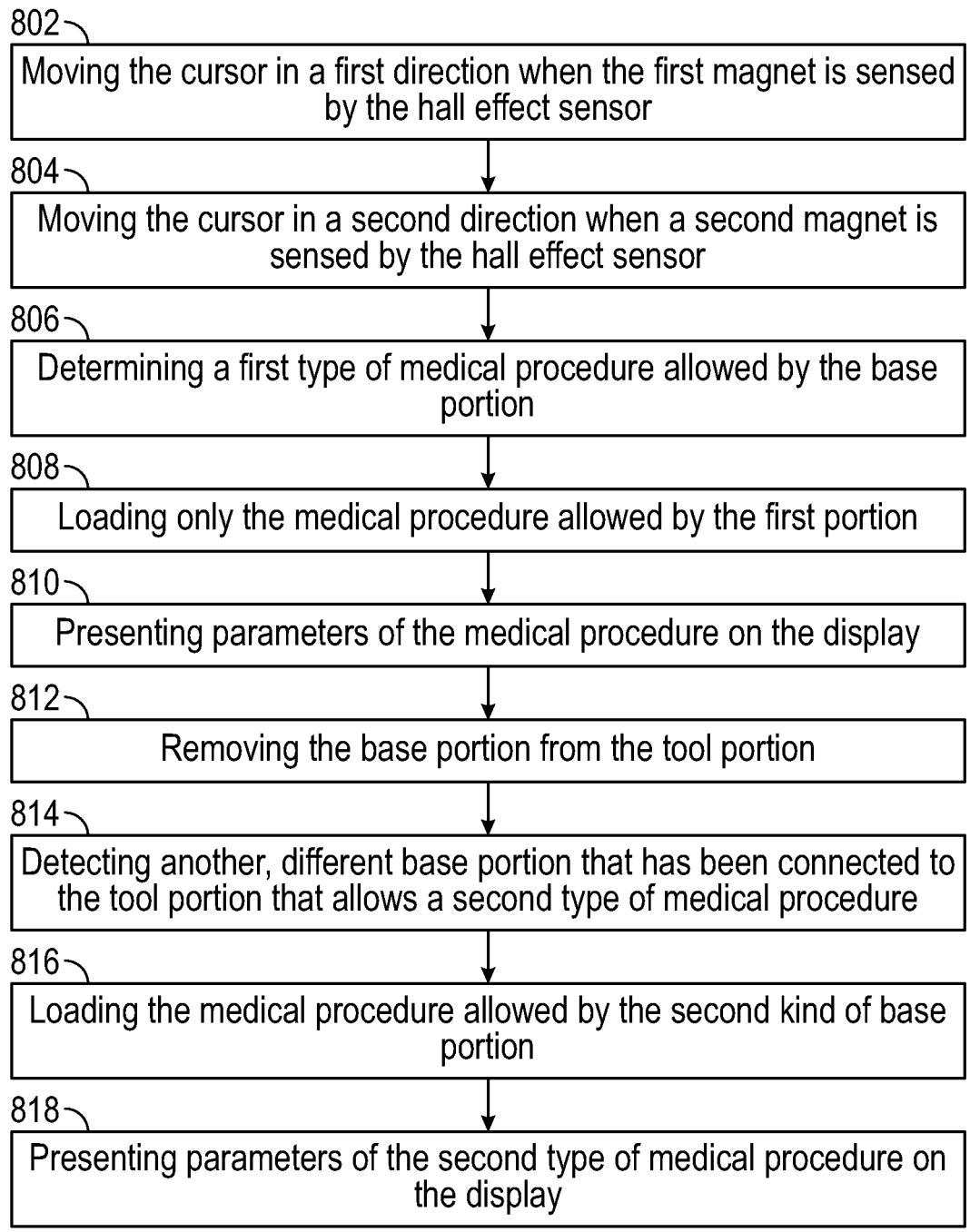
FIG. 8 is a flowchart of another example method.

FIG. 8 is a flowchart of a related method of the present disclosure. The method can include a step 802 of moving the cursor in a first direction when the first magnet is sensed by the hall effect sensor and a step 804 of moving the cursor in a second direction when a second magnet is sensed by the hall effect sensor.

The method can also include a step 806 of determining a first type of medical procedure allowed by the base portion and a step 808 of loading only the medical procedure allowed by the first portion. Next, the method includes a step 810 of presenting the parameters of the medical procedure on the display. This allows the user to fine-tune the parameters of the procedure. In some instances when a prescription base is attached, no selections need to be made. The procedures can be loaded automatically and the user can only select to start each of the prescribed procedures.

The method includes a step 812 of removing the base portion from the tool portion. The method then includes a step 814 of detecting another, different base portion that has been connected to the tool portion that allows a second type of medical procedure. Next, the method includes a step 816 of loading the medical procedure allowed by the second kind of base portion, and a step 818 of presenting parameters of the second type of medical procedure on the display.

Figure 9:
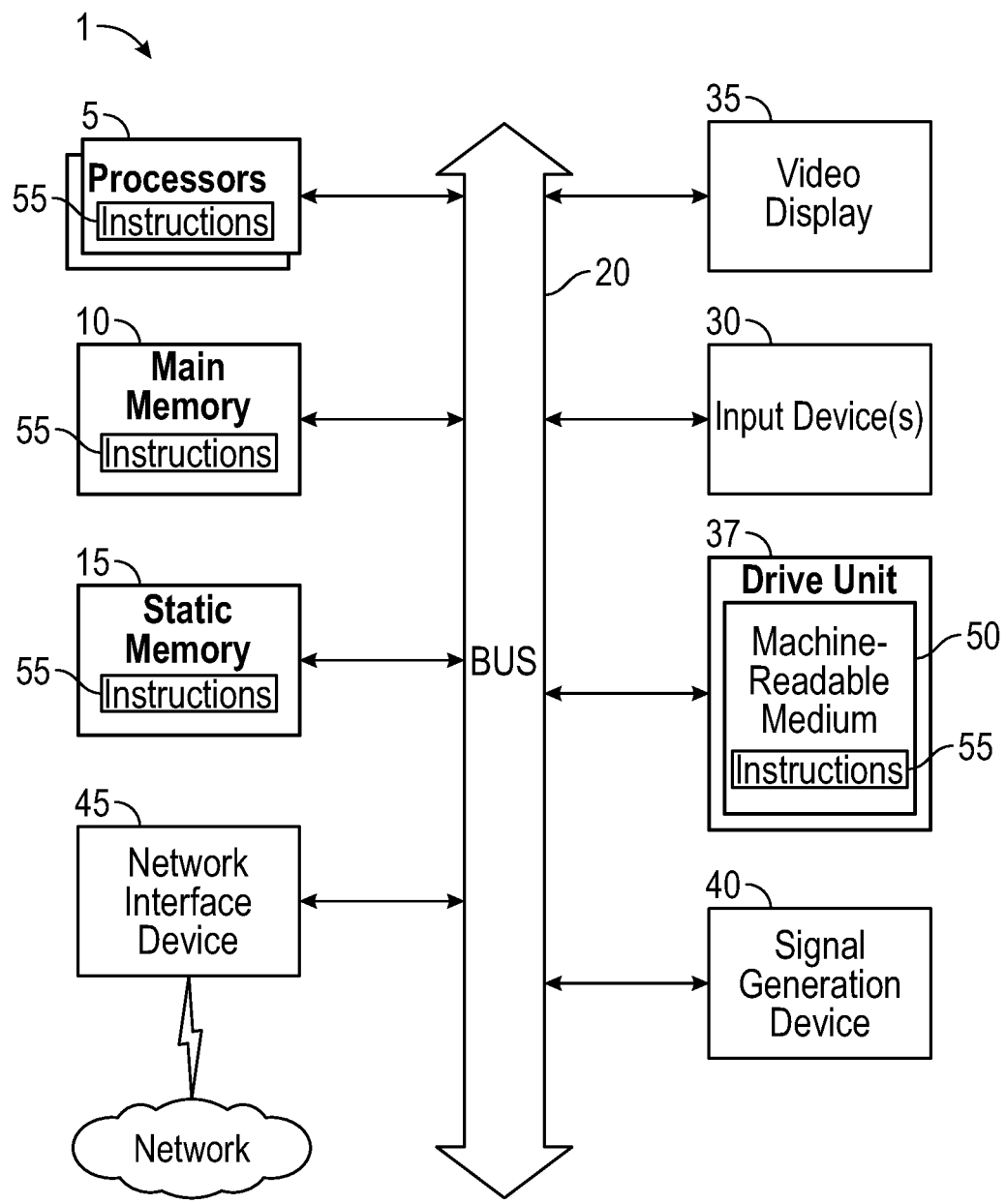
FIG. 9 is a simplified block diagram of a computing system, in accordance with some embodiments.

FIG. 9 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or decentralized) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. When enabled Wi-Fi connectivity with cloud servers, new procedures and prescriptions can be loaded on-demand via a cloud, as noted above.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or decentralized database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

What is claimed is:

1. A device, comprising:
   a first portion, the first portion comprising:
      an energy storage module; and
      a first magnet disposed on a terminal end of the first portion;
   a second portion, the second portion comprising:
      a display; and
      a hall effect sensor, the first portion and the second portion being joined together in such a way that rotation of the first portion relative to the second portion causes the first magnet and the hall effect sensor to interact with one another in such a way that a user can control the display;
   a second magnet; and
   a controller that is configured to:
      determine a direction of rotation of the first portion; and move a cursor of the display in response to the direction of rotation.

2. The device according to claim 1, wherein the controller is configured to:
move the cursor in a first direction when the first magnet is sensed by the hall effect sensor; and
move the cursor in a second direction when the second magnet is sensed by the hall effect sensor.

3. The device according to claim 1, wherein the controller is further configured to:
determine a first type of medical procedure allowed by the first portion;
load only the medical procedure allowed by the first portion; and
present parameters of the medical procedure on the display.

4. The device according to claim 3, wherein the controller is further configured to:
detect when the first portion has been removed;
detect another first portion that has been connected to the second portion that allows a second type of medical procedure;
load the medical procedure allowed by the another first portion; and
present parameters of the medical procedure on the display.

5. The device according to claim 1, wherein the display is a touchscreen and the user can confirm a selection on the display by touch.

6. The device according to claim 5, further comprising a haptic element that confirms the selection with a vibration and a button that confirms the selection when depressed.

7. The device according to claim 1, further comprising a male adapter extending from the second portion, the male adapter comprising a groove.

8. The device according to claim 7, wherein the male adapter is configured to be inserted into the terminal end of the first portion, the first portion comprising a resilient member that sits in the groove of the male adapter when the first portion and the second portion are coupled.

9. The device according to claim 8, wherein the resilient member is a circular spring.

10. The device according to claim 1, wherein the first magnet produces a first magnetic field and the second magnet produces a second magnetic field.

11. The device according to claim 10, wherein the first magnetic field and the second magnetic field are distinguishable from one another by the hall effect sensor.

12. A method, comprising:
joining a first portion of a medical device to a second portion of the medical device, the first portion comprising a first magnet, the second portion comprising a hall effect sensor;
rotating the first portion relative to the second portion to control a display of the medical device;
determining a direction of rotation of the first portion; and
moving a cursor of the display in response to the direction of rotation.

13. The method according to claim 12, further comprising:
moving the cursor in a first direction when the first magnet is sensed by the hall effect sensor; and
moving the cursor in a second direction when a second magnet is sensed by the hall effect sensor.

14. The method according to claim 13, wherein the first magnet produces a first magnetic field and the second magnet produces a second magnetic field.

15. The method according to claim 14, wherein the first magnetic field and the second magnetic field are distinguishable from one another by the hall effect sensor.

16. The method according to claim 12, further comprising:
determining a first type of medical procedure allowed by the first portion;
loading only the medical procedure allowed by the first portion; and
presenting parameters of the medical procedure on the display.

17. The method according to claim 16, further comprising:
removing the first portion;
detecting another first portion that has been connected to the second portion that allows a second type of medical procedure;
loading the medical procedure allowed by the another first portion; and
presenting parameters of the medical procedure on the display.

18. The method according to claim 12, further comprising confirming a selection on the display by receiving a touch gesture.

19. The method according to claim 18, further comprising causing a haptic element to confirm the selection with a vibration.

20. The method according to claim 12, further comprising inserting a male adapter of the second portion into the first portion, the male adapter comprising a groove.

21. The method according to claim 20, further comprising inserting the male adapter into a terminal end of the first portion such that a resilient member in the first portion sits in the groove of the male adapter when the first portion and the second portion are coupled.

* * * * *